US010565594B1

(12) United States Patent
Moore et al.

(10) Patent No.: US 10,565,594 B1
(45) Date of Patent: Feb. 18, 2020

(54) TRANSACTION CONTROL SYSTEM AND METHOD

(71) Applicant: JPMorgan Chase Bank, N.A., New York, NY (US)

(72) Inventors: Devin C. Moore, Columbus, OH (US); Ryan A. Schlosser, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1058 days.

(21) Appl. No.: 15/008,849

(22) Filed: Jan. 28, 2016

Related U.S. Application Data

(63) Continuation-in-part of application No. 14/978,370, filed on Dec. 22, 2015.

(51) Int. Cl.
*G06Q 30/00* (2012.01)
*G06Q 20/40* (2012.01)
(Continued)

(52) U.S. Cl.
CPC ......... *G06Q 20/405* (2013.01); *G06Q 10/087* (2013.01); *G06Q 20/085* (2013.01); *G06Q 20/322* (2013.01); *G06Q 30/0635* (2013.01)

(58) Field of Classification Search
CPC ............. G06Q 20/405; G06Q 30/0635; G06Q 10/087; G06Q 20/322; G06Q 20/085
(Continued)

(56) References Cited

U.S. PATENT DOCUMENTS 6,647,373 B1 * 11/2003 Carlton-Foss ......... G06Q 30/08
705/26.3
7,680,702 B1   3/2010 Oakes, III
(Continued)

FOREIGN PATENT DOCUMENTS

WO    2001/033448    5/2001

OTHER PUBLICATIONS

L. Cheok, W. Huiskamp, A. Malinowski. "E-Commerce Trends and Payment Challenges for Online Merchants: Beyond Payment". 2014. https://www.brainsins.com/es/wp-content/uploads/2014/03/descargagratuita_PDF_whitepaper_moduslink.pdf (Year: 2014).*
(Continued)

*Primary Examiner* — Jason B Dunham
*Assistant Examiner* — Anand R Loharikar
(74) *Attorney, Agent, or Firm* — Greenblum & Bernstein, P.L.C.

(57) ABSTRACT

A system controls a transaction from initiation to completion using live vendor inventory database and purchaser entered parameters from a mobile application. A network interface receives parameters entered by the subscribers through the mobile application on the subscriber mobile device and receives inventory updates from vendor systems, the inventory updates including at least a vendor price and identifying information. The system communicates with an accounts server to confirm subscriber funds and place a hold on subscriber funds equal to the required subscriber price and implementing a matching algorithm to detect matching results by determining if any vendor prices and identifying information satisfy any required subscriber prices and descriptions. The system transmits an alert to the subscriber mobile device with matching results, receives a selection from the subscriber of at least one of the matching results, conducting payment processing for the matching result and closes the transaction.

24 Claims, 9 Drawing Sheets

(51) Int. Cl.
 *G06Q 30/06* (2012.01)
 *G06Q 10/08* (2012.01)
 *G06Q 20/32* (2012.01)
 *G06Q 20/08* (2012.01)

(58) Field of Classification Search
 USPC .............................................. 705/26.1–27.2
 See application file for complete search history.

(56) References Cited

U.S. PATENT DOCUMENTS

| | | |
|---|---|---|
| 8,438,072 B2 | 5/2013 | Fusz et al. |
| 8,645,282 B2 | 2/2014 | Vakil et al. |
| 2002/0143692 A1* | 10/2002 | Heimermann ..... G06Q 10/0631 |
| | | 705/37 |
| 2002/0161707 A1* | 10/2002 | Cole ...................... G06O 20/02 |
| | | 705/42 |
| 2014/0172611 A1 | 6/2014 | Kaushik et al. |
| 2015/0081467 A1* | 3/2015 | Grigg ..................... G06Q 30/08 |
| | | 705/26.3 |
| 2015/0356663 A1 | 12/2015 | Ketchel, III et al. |
| 2017/0116655 A1 | 4/2017 | Batlle |

OTHER PUBLICATIONS

Office Action from U.S. Appl. No. 14/978,370 dated Apr. 22, 2019.

\* cited by examiner

Transaction Control System 500

TRANSACTION CONTROL SYSTEM AND METHOD

RELATED APPLICATION

This application is a continuation-in-part application of U.S. patent application Ser. No. 14/978,370, filed on Dec. 22, 2015. This application incorporates by reference and claims priority to the above-noted earlier filed application.

FIELD OF THE INVENTION

Embodiments of the present invention are generally related to systems and methods for remotely controlling a transaction, and in particular, for remotely controlling a transaction on behalf of mobile purchasers having pre-set parameters for initiation of a transaction.

BACKGROUND OF THE INVENTION

With the popularization of smartphones, tablets and other mobile devices, mobile applications, or "apps," have become household terms. Apps are computer applications that execute on mobile devices. Like applications that execute on traditional computing devices, apps allow users to perform a wide range of actions, from simple (e.g., access the Internet, take a photo) to specialized (e.g., file tax forms, play a board game). For instance, many banking institutions provide customers with apps to access to bank accounts to review balance information, transfer money, pay bills, and perform other related actions. Similarly, many financial institutions also provide customers with apps that review the performance of the stock markets, complete trades, configure automated trades using user-defined limits and stops, and perform other intricate trading operations. Various vendors provide mobile apps for use by their customers for making purchases, obtaining loyalty points and rewards, receiving information about promotions, etc.

Purchasers desiring to make a purchase typically go use mobile apps or search web sites over the Internet to find an item for purchase. Popular online sites for purchasing from multiple vendors include sites such as Amazon®. Other multi-vendor sites allow vendors and/or purchasers to make offers for on items for purchase and complete a transaction at a close of a pre-specified time period or upon receipt of an acceptable offer. For example, web sites such as Ebay® allow purchaser bidding. However, a burden is placed on the purchaser to research and ascertain the nature and character of the goods or services offered for sale. Purchasers are responsible for manually filtering data regarding desired items. For example, if a purchaser is seeking a particular shoe in a particular model, size, and color, manufactured by a particular manufacturer, the purchaser is required to manually filter this data to locate the item. Although some web sites provide filtering categories, the categories are not always representative of purchaser needs.

Some available services, such as Priceline® allow vendor bids and perform filtering for a purchaser. However, with Priceline and similar services, the purchaser is not able to view the hotel or good or service provided prior to purchasing. Thus, the purchaser has little control over the actual item purchased.

Furthermore, no current platform exists for enabling mobile app users to be notified of the availability of consumable goods, such as a meal, through a particular vendor located in close proximity to the purchaser without the user of purchaser filtering. Furthermore, in existing systems that require the purchaser to perform filtering, to locate a vendor in immediate proximity with availability and to conduct the transaction online and show up at the restaurant, the systems typically provide no assurance to the vendor of purchaser payment. Instead, payment is generally not required or verified until the purchaser reaches the establishment to obtain the consumable goods. Thus, vendors are generally not provided with any assurances that the purchaser will transfer funds and complete the transaction. The purchaser also accepts the vendor representation that the goods are available without any particular assurances. Furthermore, no cross vendor platform currently exists for vendors to offer goods and services to mobile users having predetermined preferences, thereby minimizing the effort expended on the part of both vendors and purchasers.

Accordingly, a solution is needed that will allow mobile purchasers to pre-set preferences via a mobile application and to be provided with notification when a vendor is capable of delivering goods or services that comply with the purchaser pre-set preferences. Further, a solution is needed that allows the purchaser to select an item offered by the vendor once the system has located the item and the vendor, or to select a vendor if more than one vendor is able to supply an item satisfying the pre-set purchaser preferences. The solution should automatically and dynamically notify both purchasers and vendors of transaction status from opening of the transaction to completion of the transaction.

Accordingly, the presently disclosed invention offers a solution providing assurances to both purchasers and vendors, eliminates the need for manual filtering on the part of purchasers and vendors, and controls established transactions from initiation to closing.

SUMMARY OF THE INVENTION

Embodiments of the invention are directed to a cross vendor platform that enables purchasers to utilize mobile apps to set preferences and receive vendor information in real time. Embodiments of the invention further provide functionality for remotely opening, conducting, and closing a transaction with minimal vendor and purchaser effort.

In one aspect of the invention, a transaction control system is provided for initiating, processing, and closing a transaction between a subscriber and a vendor. The system includes a computer memory storing data and instructions including at least a downloadable mobile application, wherein the mobile application is downloadable over the Internet for installation on a subscriber mobile device. The system additionally includes a network interface for receiving parameters entered by the subscribers through the mobile application on the subscriber mobile device for storage in the computer memory, wherein the parameters include at least a required subscriber price and a description. The network interface further receives receiving inventory updates from vendor systems, the inventory updates including at least a vendor price and identifying information. A live inventory database stores information entered by the vendors. The system also includes at least one computer processor executing the instructions stored in memory and accessing the stored parameters and at least one inventory database to perform multiple steps. The steps includes communicating with an accounts server to confirm subscriber funds and place a hold on subscriber funds equal to the required subscriber price. The steps further include implementing a matching algorithm to detect matching results by determining if any vendor prices and identifying information satisfy any required subscriber prices and descriptions and transmitting an alert to the subscriber mobile device when one or more matching results are detected. The alert allows the subscriber to access the matching results. The system receives a selection from the subscriber of at least one of the matching results, facilitates payment processing for the matching result, and closes the transaction.

In an additional aspect of the invention, a method is provided for initiating, processing, and closing a transaction between a subscriber and a vendor. The method includes storing, in a computer memory, data and instructions including at least a downloadable mobile application, wherein the mobile application is downloadable over the Internet for installation on a subscriber mobile device. The method additionally includes receiving, through a network interface, parameters entered by the subscribers through the mobile application on the subscriber mobile device for storage in the computer memory, wherein the parameters include at least a required subscriber price and a description. The method additionally includes receiving, through the network interface, inventory updates from vendor systems, the inventory updates including at least a vendor price and identifying information and storing the live inventory updates in a vendor database. The method further includes using at least one computer processor executing the instructions stored in memory and accessing the stored parameters and an inventory database stored in the computer memory to perform multiple steps. The steps include communicating with an accounts server to place a hold on subscriber funds equal to the required subscriber price and implementing a matching algorithm to detect matching results by determining if any vendor prices and identifying information satisfy any required subscriber prices and description. The method further includes transmitting an alert to the subscriber mobile device when one or more matching results are detected, the alert allowing the subscriber to access the matching results, receiving a selection from the subscriber of at least one of the matching results, conducting payment processing for the matching result, and closing the transaction.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the presently disclosed invention provide a method and system for transaction control. In particular, embodiments of the invention provide for remote transaction control for transactions between purchasers utilizing a mobile application on a mobile device and vendor systems. Embodiments of the invention eliminate the need for labor intensive purchaser filtering and provide real time notification to purchasers of available vendor inventory in accordance with pre-set parameters. Additionally, embodiments of the invention control a purchase transaction from initiation to closing of the transaction.

Figure 1:
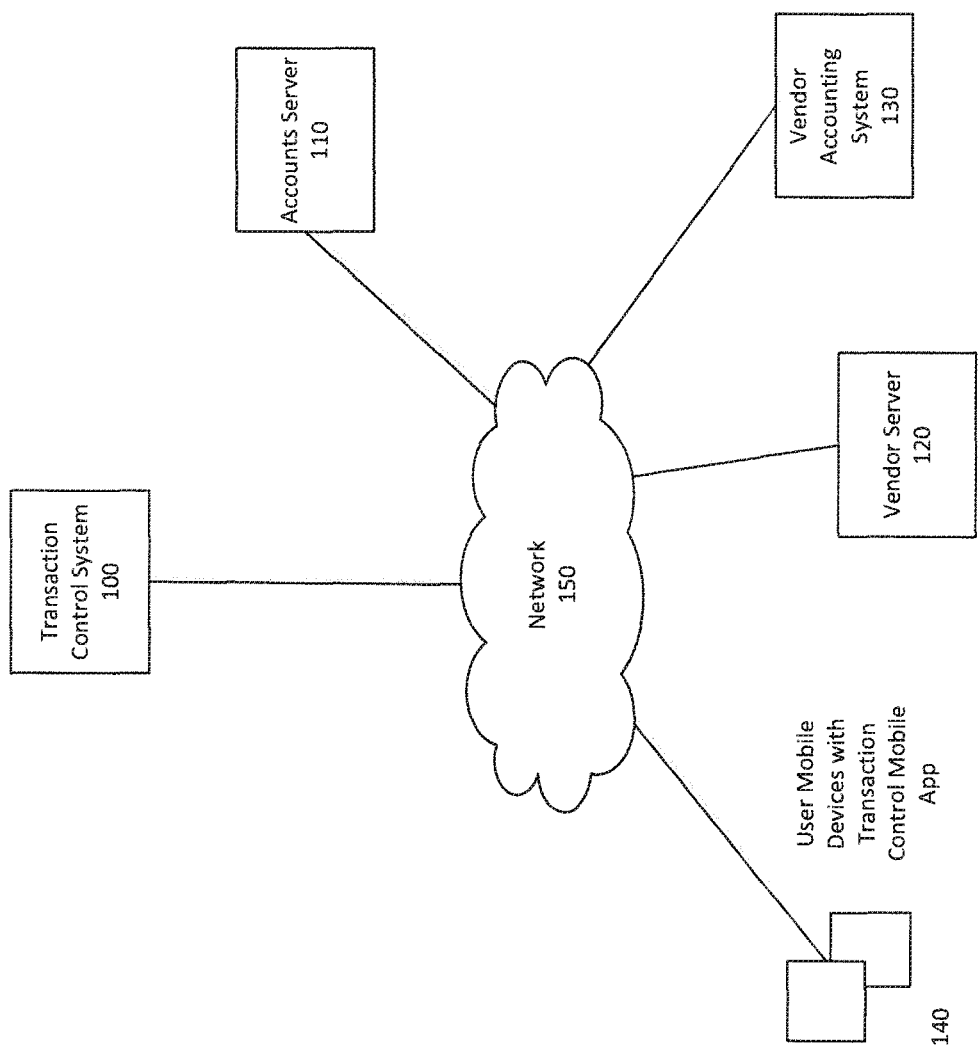
FIG. 1 is a block diagram illustrating an operating environment for a transaction control system in accordance with an embodiment of the invention.

FIG. 1 is a block diagram illustrating an operating environment for operation of a transaction control system 100 invention. The transaction control system 100 may be connected over a network 150 with multiple cooperating systems, such as an accounts server 110, vendor server 120, vendor accounting system 130, and user mobile devices 140. Additional systems or devices may be included in the operating environment.

The transaction control system 100 may operate through a host server that administers multiple computing systems and applications for internal and external users. The host server can host web sites, files, images, games and similar content. The host server can be shared among many clients. The transaction control system 100 interacts with the interconnected systems to control a transaction involving a purchase by the user mobile devices 140 from the vendor server 120.

The network 150 is preferably the Internet, but may be or include other types of networks. Furthermore, even though only one network is shown, multiple networks may be used. For example, the accounts server 110 may communicate over a different network with the transaction control system 100 than the user mobile devices 140. The network 150 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The accounts server 110 may be or include a computing system that provides access to user financial accounts. The accounts server 110 may be hosted by, for example, a financial institution and may access checking accounts, savings accounts, bank card accounts, investment accounts, and other types of accounts.

The vendor server 120 may include at least one processor and multiple applications executed by the processor capable of performing desired functions to interact with the transaction control system 100. The transaction control system 100 interacts with the vendor server 120 to ascertain vendor inventory and to provide tracking of transaction states, as will be further explained below.

The vendor systems 120 may include a browser for accessing information provided by the transaction control system 100 and other connected systems that offer such functionality over the Internet or any other network. The vendor systems 120 may additionally be or include mobile systems, such as smart phones, tablets, or other portable computing apparatus. Mobile vendor systems may execute downloadable applications for operating in conjunction with the transaction control system 100. The downloadable applications may be stored in memory and executed by processors on the mobile systems and may provide a plurality of user interfaces. The vendor systems 120 may include mainframe computers, personal computers, desktop or laptop computing systems and the like.

The vendor accounting system 130 may track payments to and from vendor systems. Embodiments of the invention integrate with the vendor accounting system 130 so that payment processing is directly reported to the vendor accounting system 130.

The user mobile devices 140 may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These mobile devices 140 may utilize a downloadable app supplied by the transaction control system 100 for use in conjunction with the transaction control system.

Figure 2:
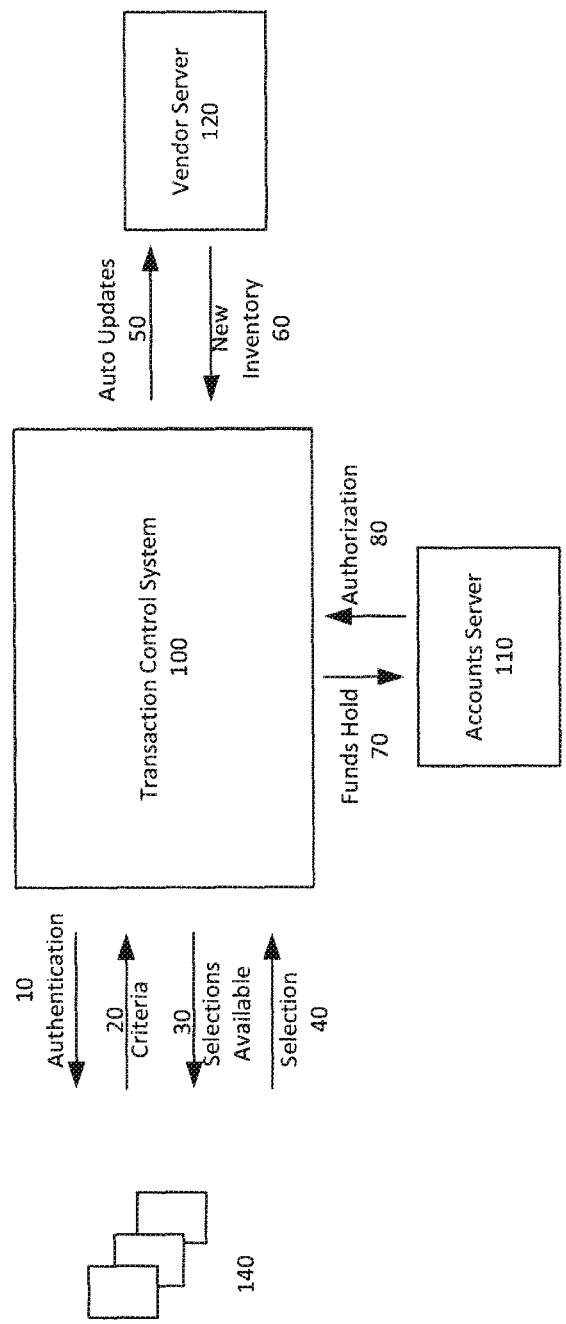
FIG. 2 is a flow diagram illustrating an exemplary flow between the transaction control system and other components of the operating environment in accordance with an embodiment of the invention.

FIG. 2 illustrates data flow between the transaction control system 100 and other system components. With respect to the user mobile devices 140, once the mobile devices have downloaded the transaction control mobile application, the transaction control system may exchange an authentication dialog 10 with the user mobile device. Once the user has been authenticated, the user may enter criteria or parameters 20 for transmission to the transaction control system 100. The criteria or parameters preferably include information related to one or more items that the mobile device user would like to purchase. The criteria include a price that the purchaser would like to pay for the item for purchase as well as a description of the item. The description may be general or specific. For example, when the user intends to purchase goods, the description may include a model number and/or manufacturer. Alternatively or additionally, the description may include descriptive keywords. For example, a description may include a manufacturer, model number, size, and color. Users may also enter descriptions of desired services using descriptive keywords. The transaction control system 100 conducts a filtering process on these descriptions in conjunction with a search of a live inventory database containing vendor real time inventory updates and is thus able to deliver available selections 30 to the mobile user. The available selections 30 might include multiple identical products from different vendors, a single product from a single vendor, or multiple products from one or more vendors that are similar, but not identical. Upon reviewing the selection, the user, via the mobile application, selects one or more of the selections presented. Other interaction between the transaction control system 100 and the user mobile devices 140 is within the scope of the invention.

The transaction control system 100 simultaneously interacts with the vendor server 120 to receive vendor inventory updates 60 and to make auto-updates 50 to vendor inventory and vendor transactions in a live inventory database of the transaction control system. The auto-updates 50 may, for example, decrease vendor inventory when a transaction has been completed, thus resulting in a subtraction from inventory. Furthermore, the auto-updates 50 may include transaction updates. For example, the transaction control system 100 notifies the vendor that an item is "on hold" when the transaction control system 100 sends an item from a particular vendor to a user mobile device as a potential selection. If the user chooses to purchase the selection, the auto-update will subtract the item from inventory. If the user does not choose to purchase the item offered as a selection, the transaction control system provides an auto-update by releasing the hold on the inventory. Other interaction between the transaction control system 100 and the vendor server 120 is within the scope of the invention.

The transaction control system 100 also interacts with the accounts server 110 to perform various functions. For example, upon receiving the criteria from the user mobile device including the desired price, the transaction control system may execute a funds hold, for example on a user credit card, through the accounts server 110. Alternatively, the funds hold may be executed on another type of account. Once the user makes a selection as described above, the transaction control system 100 may interact with the accounts server 110 and other components of the environment to authorize and process the transaction so that the funds are transferred from user accounts to vendor accounts.

Figure 3:
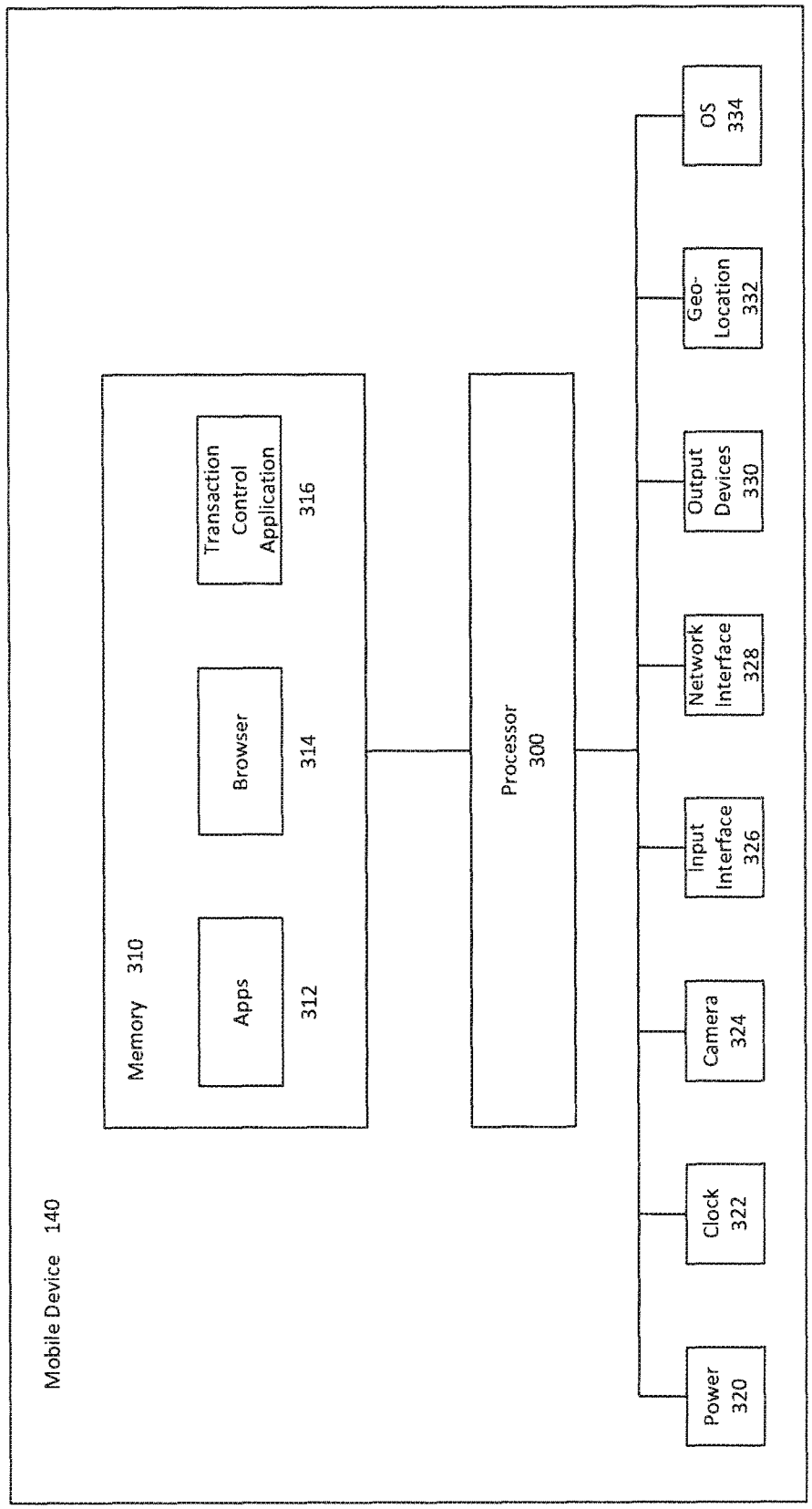
FIG. 3 is a block diagram of a mobile device operating in conjunction with the transaction control system in accordance with an embodiment of the present invention.

FIG. 3 illustrates a user or subscriber mobile device 140 in accordance with an embodiment of the invention. The mobile device 140 may include a processor 300 and a memory 310. The memory 310 may include, for example, applications 312, a browser 314, and a transaction control mobile application 316. The processor 300 may also be connected to additional components, either stored in a memory or installed as separate hardware components, such as for example battery or power source 320, clock 322, camera 324, input interface 326, network interface 328, output devices 330, geo-locator 332, and operating system 334.

The mobile device 140 may be or include any of the devices or systems described above with respect to FIG. 1. In embodiments of the invention, users may be required to subscribe to the transaction control system in order to use the transaction control mobile application 316. The transaction control system links to financial accounts of the purchaser, and therefore the use of a subscription facilitates processing for purchasers. The transaction control mobile application 316 may store subscriber preferences for products and services in order to provide subscribers with real time notification of the availability of matching products and services available from participating vendor systems. In embodiments of the invention, the subscribers may set an open time frame for purchases indicating that the subscriber agrees to purchase a particular product or service for a pre-set price whenever that product is available. In other embodiments the entered parameters may include a particular predetermined time frame limited to particular hours, to particular dates, or ending on a particular date. Thus, the transaction control application 316 operates in conjunction with the clock device 322 to facilitate selection of products and services for the mobile user.

Purchaser parameters may also include locality parameters. For example, the transaction control mobile application 316 may operate in conjunction with the geo-location apparatus 332 in order to determine a current purchaser location and may provide purchasers with products within a pre-set radius, for example, a five mile radius, of the current location. Purchasers may further set one or more particular locations where they would like to locate a product or service.

The purchaser may additionally enter descriptive parameters in to the transaction control application 316 to describe the desired product or service. For example, the purchaser may enter a manufacturer, model number, size, color, SKU, etc. Furthermore, the transaction control mobile application 316 may operate in conjunction with the camera 324 in order to described a desired product or service. The purchaser may utilized the camera of the mobile device 140 to capture an image of the desired product or service and upload the image to the transaction control system through the transaction control mobile application 316.

While the mobile device 140 is described herein as interacting over the Internet with the transaction control system 100 through the use of the transaction control mobile application 316, the mobile device 140 may additionally or alternatively interact with the transaction control system 100 using a browser 314 to access a transaction control system website as will be further described below. In embodiments of the invention, the transaction control mobile application causes the subscriber mobile device to access one or more URLs from the transaction control website.

Figure 4:
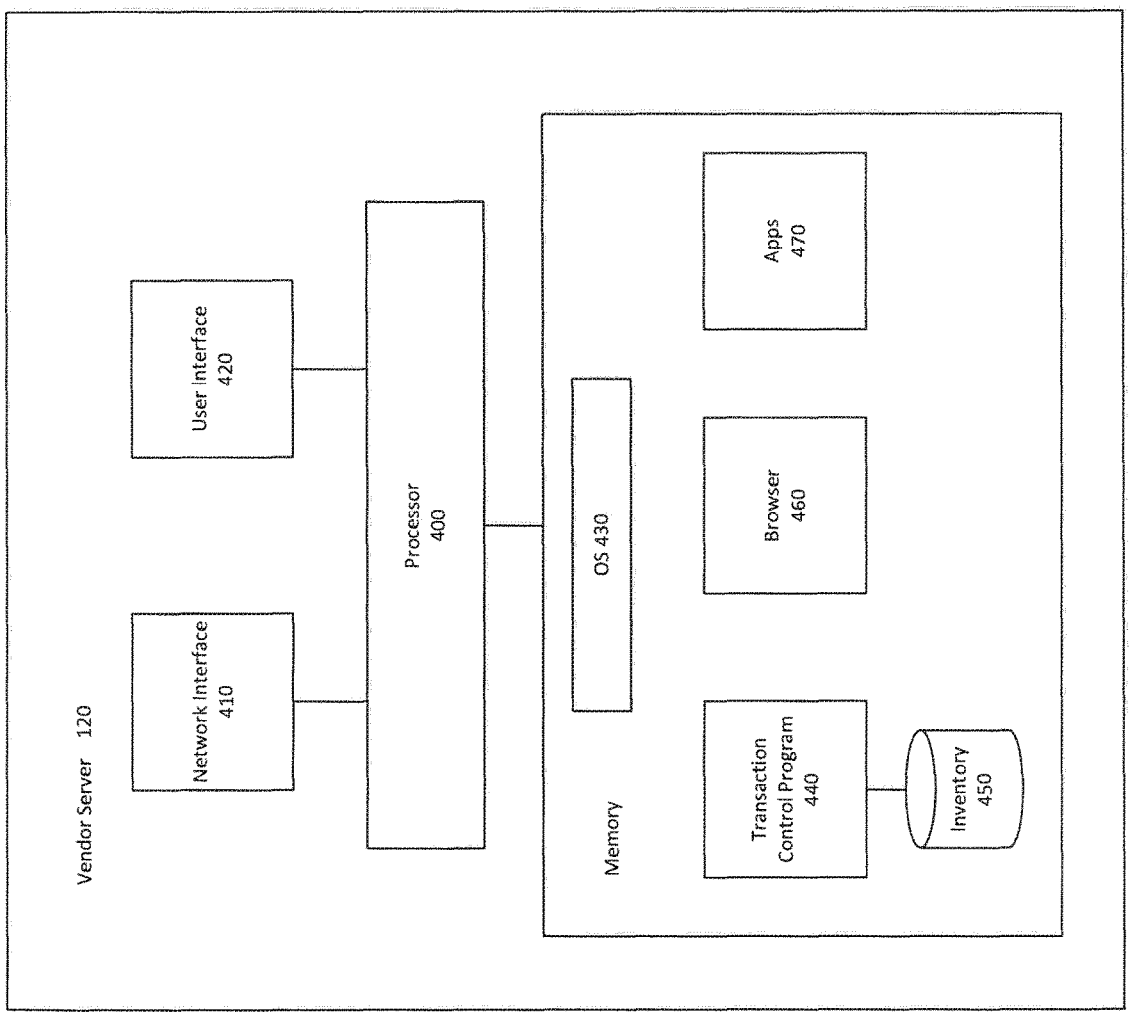
FIG. 4 is a block diagram illustrating a vendor system operating in conjunction with the transaction control system in accordance with an embodiment of the invention.

FIG. 4 illustrates details of a vendor server 120 in accordance with an embodiment of the invention. The vendor server 120 may include, for example, a processor 400 and a memory 425. The memory 425 may for example, include an operating system 430, a transaction control program 440 connected with vendor inventory 450, a browser 460, and various applications 470. The vendor server may also include a network interface 410 for communicating with the transaction control system 100 and other systems over a network and a user interface 420 allowing viewing and input directly by the vendor.

While the vendor server 120 is described as including the transaction control program or application 440, the vendor server 120 may additionally or alternatively interact with the transaction control system 100 over the Internet using the browser 460 to access the transaction control website.

The inventory database 450 is shown as stored within the memory 425 of the vendor server 120. However, the inventory database may additionally or alternatively be stored in a separate area accessible to the vendor server 120 and the transaction control system 100. Additionally, as described below, the transaction control system 100 may maintain a larger consolidated live inventory database storing inventory for multiple participating vendors and updating the inventory in real time.

Figure 5:
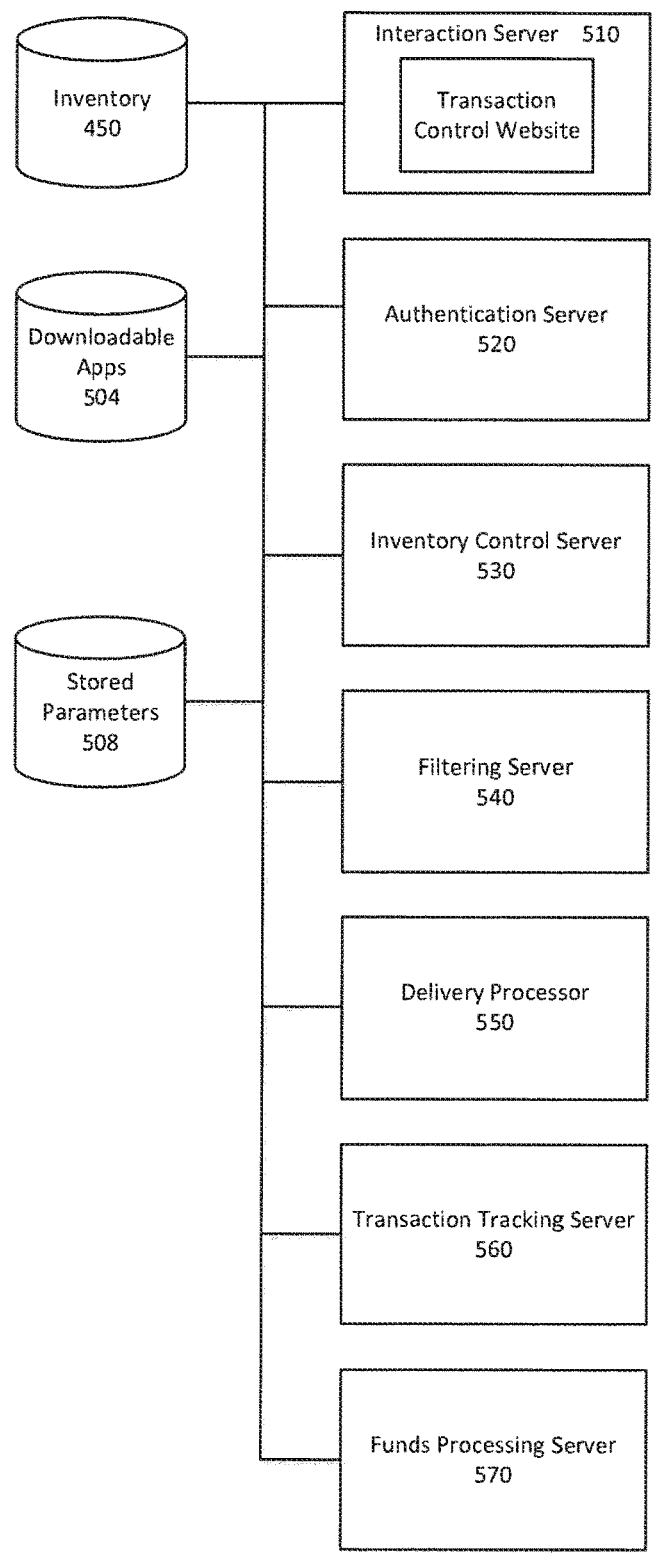
FIG. 5 is a block diagram illustrating a transaction control system in accordance with an embodiment of the present invention.

FIG. 5 illustrates a transaction control system 100 in accordance with an embodiment of the invention. The transaction control system 100 may include one or more computers having processors and memories and running algorithms to perform specific functions. In addition to the features shown, various other hardware and software components may be included within the system and are within the scope of the invention. The transaction control system 100 may include an interaction server 510 providing a transaction control website 512, an authentication server 520, an inventory control server 530, a filtering server 540, a delivery processor 550, a transaction tracking server 560, and a funds processing server 570. The transaction control system 100 may further include a live inventory database 502, downloadable applications 504 and stored parameters 508. Additional components may also be provided.

The live inventory database 502, downloadable applications 504, and stored parameters 508 may be housed in data storage areas that include a computer memory structure capable of storing data and may include one or more databases. The data storage areas may store data gathered from the various sources described above with respect to FIG. 1. This data may be structured, semi-structured, or unstructured. The data storage areas may include file systems and databases for storing large amounts of data. For example, the data storage areas may include HP SPAR StoreServ® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data The live inventory database 502 may be updated through communications with the vendor system through the interaction server 510 and the transaction control website 512. The live inventory database 502 may further be updated by the inventory control server 530, which communications with the transaction tracking server to determine when a transaction has been closed and to update inventory accordingly. In embodiments of the invention, the interaction server 510 receives updates continuously directly from the vendor inventory system and updates the live inventory database 502. In other embodiments of the invention, vendors may also update the live inventory database manually through the transaction control website 512 or other mechanism provided by the interaction server 510. The live inventory database 502 may not only include inventory and descriptive information, but may also store vendor data, such as vendor hours, vendor account information, vendor location, and other factors impacting filtering of subscriber parameters to find vendor matches. Typically, vendors will subscribe to the transaction control system such that data including location, hours, and account information need only be updated when a change occurs.

The downloadable applications 512 preferably include a downloadable mobile app for use by the subscriber. The mobile app is downloadable over the Internet via a network interface to the subscriber mobile devices as described above. In embodiments of the invention, the subscriber visits the transaction control website using a browser application to download the mobile application. Once downloaded, the downloadable mobile application may operate on the user mobile devices to interact with the transaction control website 512. The downloadable applications may also include a vendor application for use with vendor systems. Various types of apps may be provided for vendor systems given the variety of vendor systems implemented.

The stored parameters 508 include subscriber entered parameters received through the mobile application and/or the transaction control website 512. The parameters include descriptions of desired products or services and a desired price for the product or service. The parameters may also include a location for the product or service. For example, if the product is a selection offered at a multiple restaurants, the subscriber will likely set a parameter to indicate a geographic requirement for the restaurant. The subscriber will also likely select a time limitation, such as "ASAP" or "between 6 and 9 PM on Fridays". Even when the product is a shippable item, such as a pair of shoes, or a shirt, the subscriber may want to view the product in person or pick up the product immediately and therefore may also set geographic and time parameters. Descriptions of the product may be entered through keywords. Embodiments of the invention may further provide menus of selectable parameters through the mobile application that include "manufacturer", "model number", "color", "size", "location", "time", etc. Account information of subscribers may also be entered by subscribers through the mobile app and thus, subscriber account information and address information may also be stored as parameters.

The interaction server 510 controls and enables interaction between the vendor systems and the transaction control system 100 and between the subscriber mobile systems and the transaction control system 100. The interaction server 510 provides a the transaction control website 512 for interaction, but may also trigger alerts, send notifications, and provide a path for updating vendor and subscriber systems. The interaction server 510 receives pre-set parameters from both subscribers and vendor systems. The interaction server forwards vendor parameters for storage in the live inventory database 502 and forwards subscriber parameters for storage in the stored parameters database 508. Both vendors and subscribers typically enter descriptive parameters and prices. In embodiments of the invention, the interaction server 510 may allow vendors to interactively make offers for items matching purchaser entered parameters. When the filtering server 540 matches vendor offerings to subscriber parameters, the interaction server 510 alerts the subscriber of the matches with a newly generated URL from the transaction control website 512 that provides selection information to the subscriber.

The interaction server 510 may receive and manage the subscriber and vendor information to ensure accurate matching with vendor specifications. The interaction server collects data generated from the systems and may include or be incorporated in a computer system for receiving and processing large amounts of data across disparate file management systems. In one preferred embodiment of the invention, the interaction server 510 receives and processes data across disparate file management systems with a distributed file data management system such as Hadoop®. Those of ordinary skill in the art will appreciate that other distributed file data management systems such as Spark®, HDCC®, and Storm® may be used to receive and process data across disparate file management systems. The interaction server 510 may execute "extract, transform, and load" ("ETL") procedures to gather data from the vendor storage areas and account servers. Using ETL procedures, interaction server 510 may then synthesize the data for combining into the data storage areas. Thus, the interaction server 510 operates to receive and perform initial processing for all requests received from mobile devices, other systems participants, and outside sources. In response to receiving a request, the interaction server 510 selects and forwards the request to the engine responsible for satisfying the request. The interaction engine 604 will also receive responsive information from the servers of the system and will form the transmission based on the received information. Thus, for instance, the interaction server 510 will automatically generate a transmission with a structure that would be understood by a given app with which the transmission is directed. The interaction server 510 will also form messages for other computer systems internal and external to the system The authentication server 520 may server to interact with user mobile devices to authenticate subscribers using the mobile devices. Authentication may occur through standard methods including usernames, passwords, security questions, and biometric factors.

The inventory control server 530 may interact with the live inventory database 502 and vendor system to ensure that vendor inventory is updated in real time. When the vendor receives new available inventory, the vendor updates its system if the inventory is to be available for purchase. The transaction control system may receive updates from the vendor inventory system to update the live inventory database 502. During the course of a transaction, the inventory control server 530 places a hold on an available unit of inventory when the filtering server 540 finds a match with stored parameters 508. The inventory control server 530 removes the hold and releases the inventory when the purchaser does not select the offered inventory produced by the filtering server 540. When the purchaser does select the offered inventory through the interaction server 510, the inventory control server 530 automatically deducts the purchased item from available inventory in the live inventory database 502. In embodiments of the invention, the transaction control system also delivers the updates from the inventory control server 530 to the vendor system in order to automatically update the vendor system. In other embodiments of the invention, the inventory control server 530 operates on multiple inventory databases in discrete locations maintained by multiple participating vendors.

Whether the inventory check is based on the contents of one live inventory database, or on multiple disparate inventory systems, the transaction control system knows at the time of the inventory check, based on interaction between the funds processing server 570 and the accounts server that the subscriber has the funds to pay the vendor. Prior to acceptance by any vendor, the system notifies each vendor through the interaction server that each vendor has a potential transaction pending for the matching item. Only after selection does the potential sale drop off all of the non-selected vendor pending transactions.

The filtering server 540 executes algorithms to match purchaser entered criteria with available participating vendor inventory. The available participating vendor inventory may be assessed based on pre-set parameters received form the vendor systems vendor in conjunction with each available unit of inventory. For example, vendors may enter a pre-set price for each unit of inventory. As will be further described below, vendors may also submit specific offers in response to input subscriber parameters. If the description of the unit of inventory entered by the vendor matches with the purchaser pre-set parameters, the filtering server 540 returns the unit of inventory as a match. For example, if the vendor pre-set price matches with the purchaser entered parameters by being either less than or equal to the purchaser-entered price, then the filtering server 540 returns the item of inventory as a match. In embodiments of the invention, the filtering server 540 may filter initially based on location and subsequently based on description and price. If the filtering server 540 fails to locate any items of inventory that match both respect to description and price, it may return those items as suggestions that may be conveyed through the interaction server. Alternatively, the filtering server 540 may produce suggestions that allow the purchaser to modify the description and or pre-set price through the interaction server 510. When the filtering server 540 locates matches, it notifies the inventory control server 530 so that a hold can be placed on matching inventory. The filtering server 540 may execute one or more algorithms to arrive at an ordered list of vendor offerings for each input set of subscriber parameters. The ordered list may include both individualized offers tailored by vendors and live inventory listing extracted from vendor inventory. Thus, the items on the last may be ranked by the system. The ranking may be based on multiple factors, including, but not limited to, the degree of correspondence between the item offered by the vendor and the subscriber input parameters, the relative proximity of the parties, feedback on vendor performance from subscribers.

The delivery processor 550 may be included in embodiments of the invention and may be utilized to monitor delivery of purchased goods and services. The delivery processor 550 may provide incentives for timely and satisfactory delivery as will be further explained below. The delivery processor 550 may be configured to receive feedback from subscribers regarding the adequacy of delivery in multiple respects. For example, the delivery processor may find inadequate delivery if the delivery is not timely, if the delivery fails to take place, if the goods delivered are of poor quality, or if the goods delivered do not correspond to the description provided by the vendor.

The transaction tracking server 560 may serve to track transactions from opening to closing. For example, while input of user parameters may open a transaction, multiple steps may occur prior to the closing of a transaction. The transaction tracking server 560 tracks transactions for all participating vendors and subscribers and conveys the status of the transaction to the remaining servers. For example, upon opening of a transaction through entry of parameters through interaction server 510, the transaction tracking server opens a transaction for the subscriber. Upon selection of an item by a subscriber, the transaction tracking server 560 records the vendor and upon payment and delivery closes the transaction between the subscriber and vendor. Thus, at any particular moment in time, the transaction tracking server 560 is tracking the status of multiple open transactions. The transaction tracking server 560 may provide notice to the interaction server 510 of potential transactions for each vendor once a transaction has been opened through entry of subscriber parameters and filtering to find matches from a particular vendor. This enables the interaction server 510 to display to the vendor systems a list of all potential pending transactions. If the purchaser makes a selection and does not select the particular vendor, the interaction server 510 will drop the potential transaction from the list.

The funds processing server 570 may interact with the accounts server to ensure that holds on subscriber accounts, payment authorizations, and payment processing are conducted in the appropriate sequence for each potential transaction. The funds processing server 570 receives information from the interaction server 510 so that input of parameters through the interaction server 510 results in a hold by the funds processing server 570 and input of a selection through the interaction server 510 results in funds processing through the funds processing server 570. In embodiments of the invention, communication with the delivery processor 550 results in further funds processing by the funds processing server as will be further described below in conjunction with methods of the invention.

Thus, the transaction control system communicates with system participants, performs matching, sends available selections, and receives a selection prior to processing a funds transfer and completing the transaction.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 6:
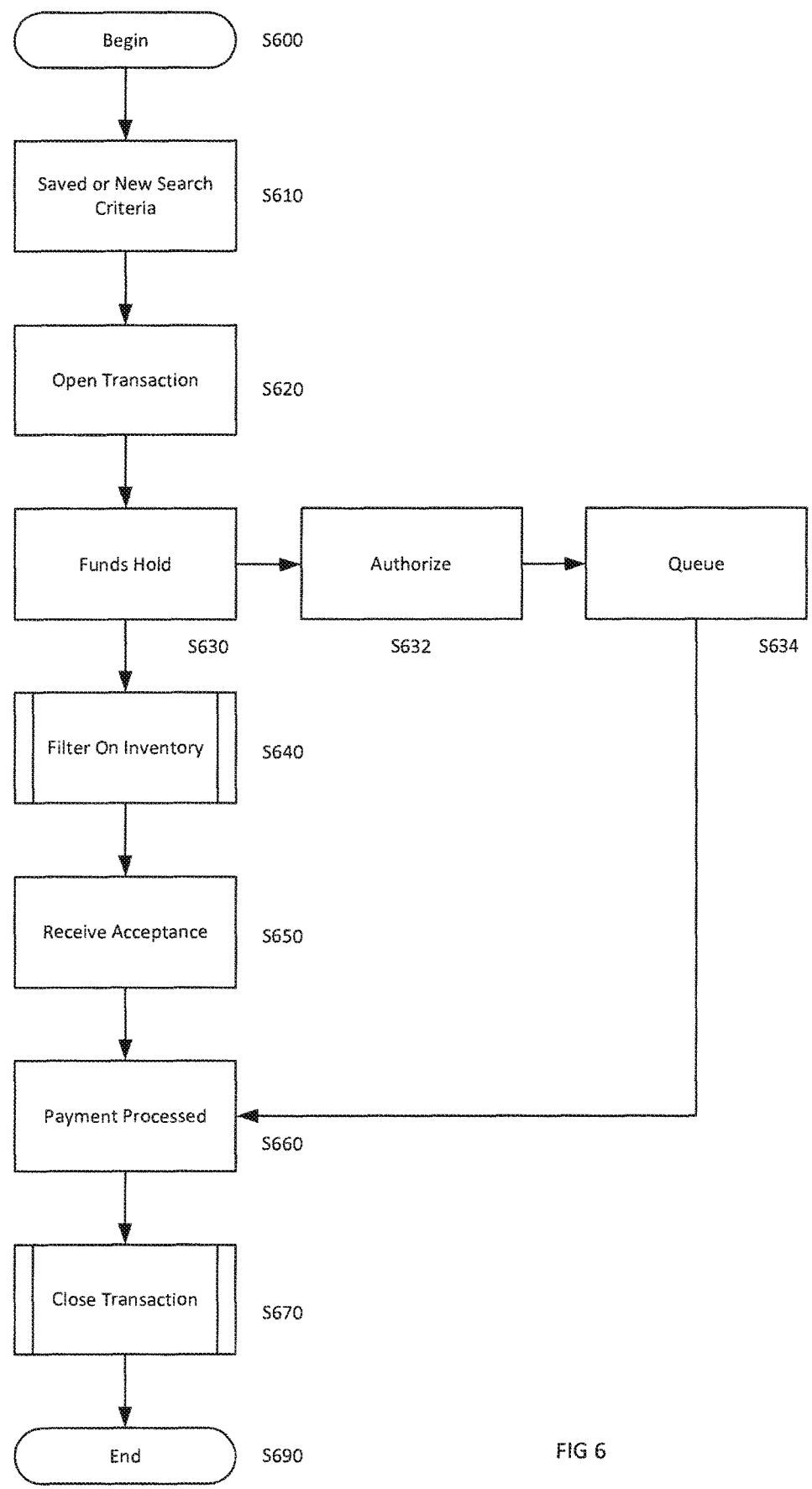
FIG. 6 is a flow chart illustrating a transaction control method in accordance with an embodiment of the present invention.

FIG. 6 illustrates a method for controlling a transaction in accordance with an embodiment of the invention. The process begins in S600. The system locates saved or new search criteria in S610. For example, the saved or new search criteria may be purchasing criteria entered by a purchaser through the mobile app as described above. If the criteria are saved criteria, the purchaser has indicated that an ongoing search for the entered criteria should be conducted.

In S620, the transaction control system opens a transaction using the transaction tracking server. The open transaction relates to the purchaser having entered the new or saved criteria, but is not immediately associated with a vendor.

In S630, the system performs a funds hold through the funds processing server and communication with the accounts server and further authorizes and queues the pending transaction.

In S640, the system filters on inventory using the filtering server. Thus, the filtering server compares the buyer entered or saved criteria to available vendor inventory. Upon locating matches, the system notifies the purchaser through the interaction server of the matches. This notification may be provided in the form of an alert, for example a text message or an email alert having a selectable link generated by the interaction server that will cause the purchaser mobile app to open and allow the purchaser to view a menu of available selections provided through the transaction control system website. In preferred embodiments of the invention, the selectable URL link is a uniquely generated link by the interaction server for each set of selections offered to each subscriber. The subscriber or purchaser is able to select one or more of the provided options through the mobile application. As will be further described below, the transaction control system, through inventory control server, may place a hold on the inventory item for all of the vendors having a selection presented to the purchaser.

In S650, the transaction control system receives the purchaser selection at the interaction server and processes the payment through the funds processing server in S660. In S670, the transaction control system closes the transaction by performing appropriate vendor inventory updates through the inventory control server and altering the transaction state through the transaction tracking server and the process ends in S690.

Figure 7:
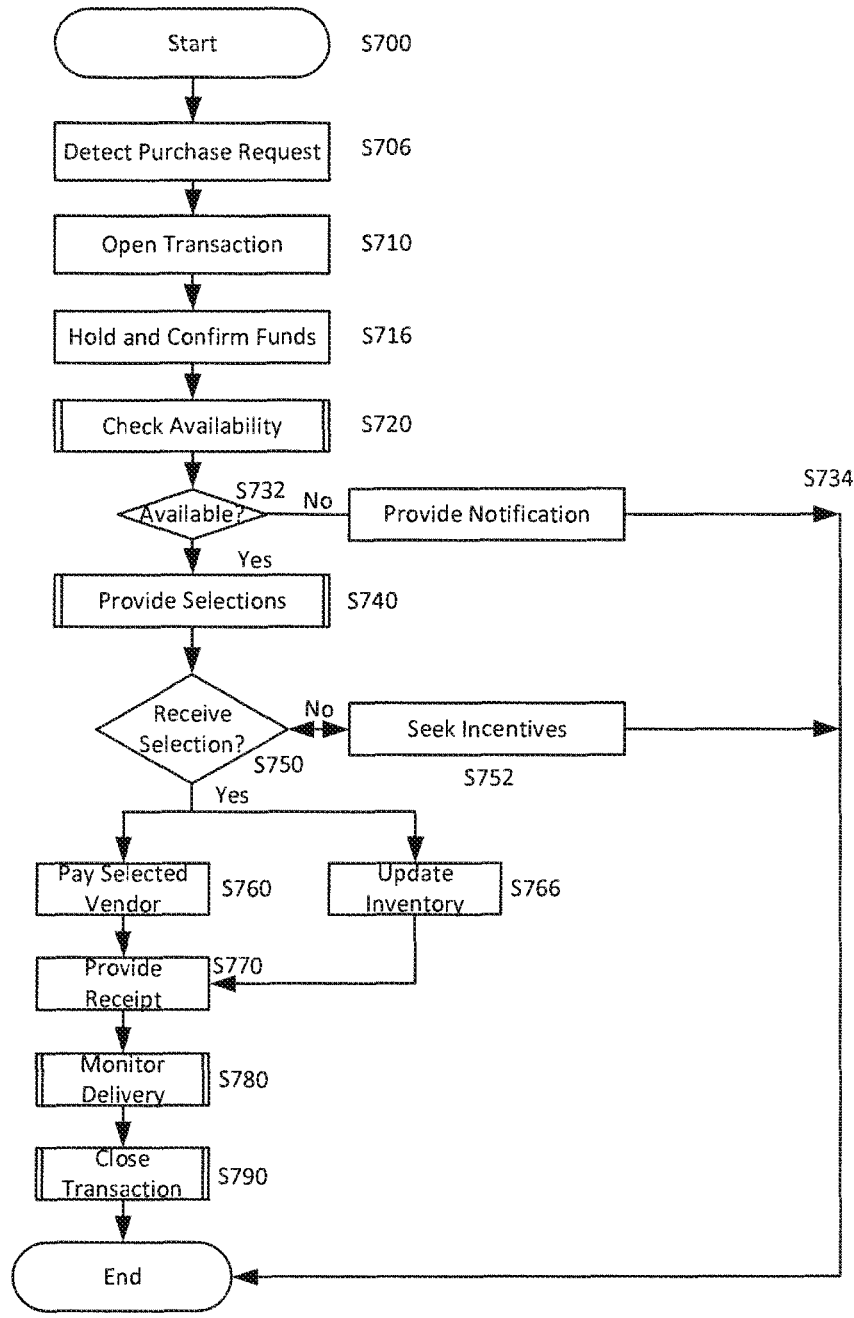
FIG. 7 is a flow chart illustrating a transaction control method in accordance with another embodiment of the invention.

FIG. 7 illustrates a transaction control method in accordance with a further embodiment of the invention. The method begins in S700 and the transaction control system 100 detects a purchase request through the interaction server in S706. In S710, the transaction control system opens the transaction using the transaction server with respect to the particular purchaser. In S716, the transaction control system holds and confirms funds through the funds processing server. In S720, the system performs filtering using the filtering server to check for availability of the item specified in the purchase request. If the item is not available in S732, the system provides notification through the interaction server in S734. If the item is available in S732, the system provides selections to the purchaser through the interaction server in S740. The system may provide the selection generating a unique URL containing the selections on the transaction control website, by sending an alert to the subscriber mobile device including the URL, wherein selection of the URL will open the subscriber mobile app on the mobile device and allow the subscriber to view available selections on the transaction control web site. These alerts can be received by the subscriber mobile device when the subscriber is offline and bring the subscriber online through selection of the uniquely generated URL. If the system does not receive a selection from the purchaser in S750 within a predetermined time period, the system may utilize the interaction server to seek incentives from vendors in S752. For example, vendors may provide coupons or other offers. If the vendors provide incentives, the time period for receipt of selection may be extended in S752 for a predetermined period. If no selection is received in 750, the process ends in S792. If the system receives a selection in S750, it pays the selected vendor in S760 through interaction between the funds processing server and the accounts server and updates the inventory for all vendors in S766 using the inventory control server. The system may provide receipts through the interaction server to both vendors and purchaser subscribers in S770. In the displayed embodiment, the system monitors delivery in S780 using the delivery processor and closes the transaction with the transaction tracker when delivery is completed in S790. The process ends in S792.

Figure 8:
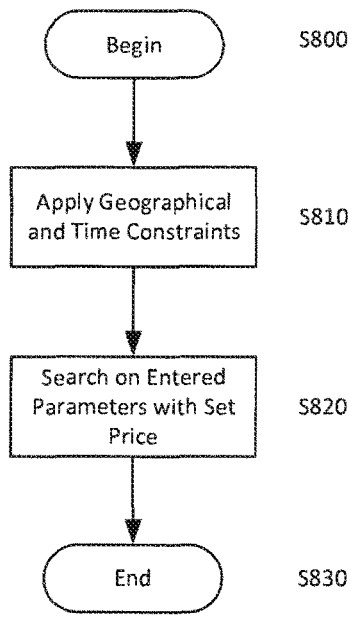
FIG. 8 is a flow chart illustrating a filtering process of the transaction control method in accordance with an embodiment of the present invention.

FIG. 8 illustrates a filtering process in accordance with an embodiment of the invention. The process begins in S800 and the system applies the purchaser entered geographical and time constraints in S810 if such constraints exist. One or both of these types of constraints typically exist with respect to saved requests and may or may not exist with respect to newly entered requests. In S820, the system searches on entered parameters using the filtering server where the geographical and time constraints can be satisfied. For example, if the product is a large vegetarian pizza desired ASAP, the system will filter out all establishments outside of the desired geographic area and currently closed. The system will then proceed to search on the particulars of the pizza desired as well as the desired price. When producing results, the system will not show results for establishments that are currently closed or that are located outside of the desired geographic area. In order to fully execute the search, vendors must interact with the transaction control system in order to fully establish open hours and geographic locations. The process ends in S830.

Figure 9:
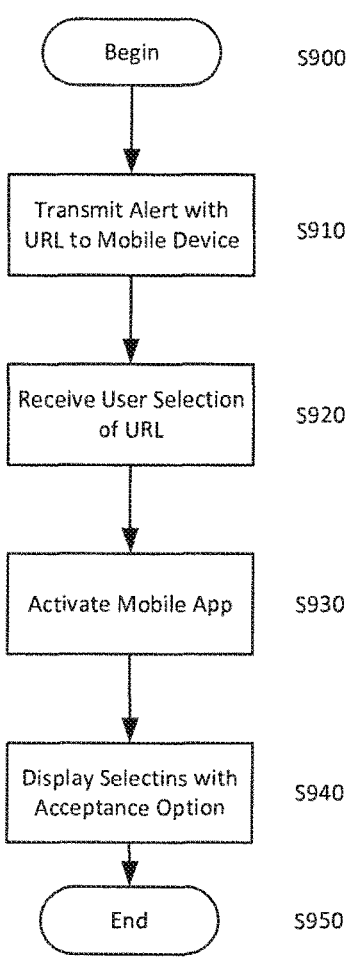
FIG. 9 is a flow chart illustrating an alert transmission process of the transaction control method in accordance with an embodiment of the invention.

FIG. 9 illustrates a process for providing available selections in accordance with an embodiment of the invention. The process begins in S900 and the system transmits an alert to the mobile device in S910. The alert may, for example, be a text or an email containing a uniquely generated URL for each set of selections leading the subscriber to the transaction control website. In S920, the transaction control system receives selection of a URL. In S930, selection of the URL activates the mobile application on the subscriber. In S940, the mobile app displays the web site address referenced by the URL that contains selections available to the purchaser with acceptance options. The process ends in S950. Thus, selection of the URL by the purchaser will activate the purchaser mobile application and take the purchaser to the transaction control web site to view available selection.

Figure 10:
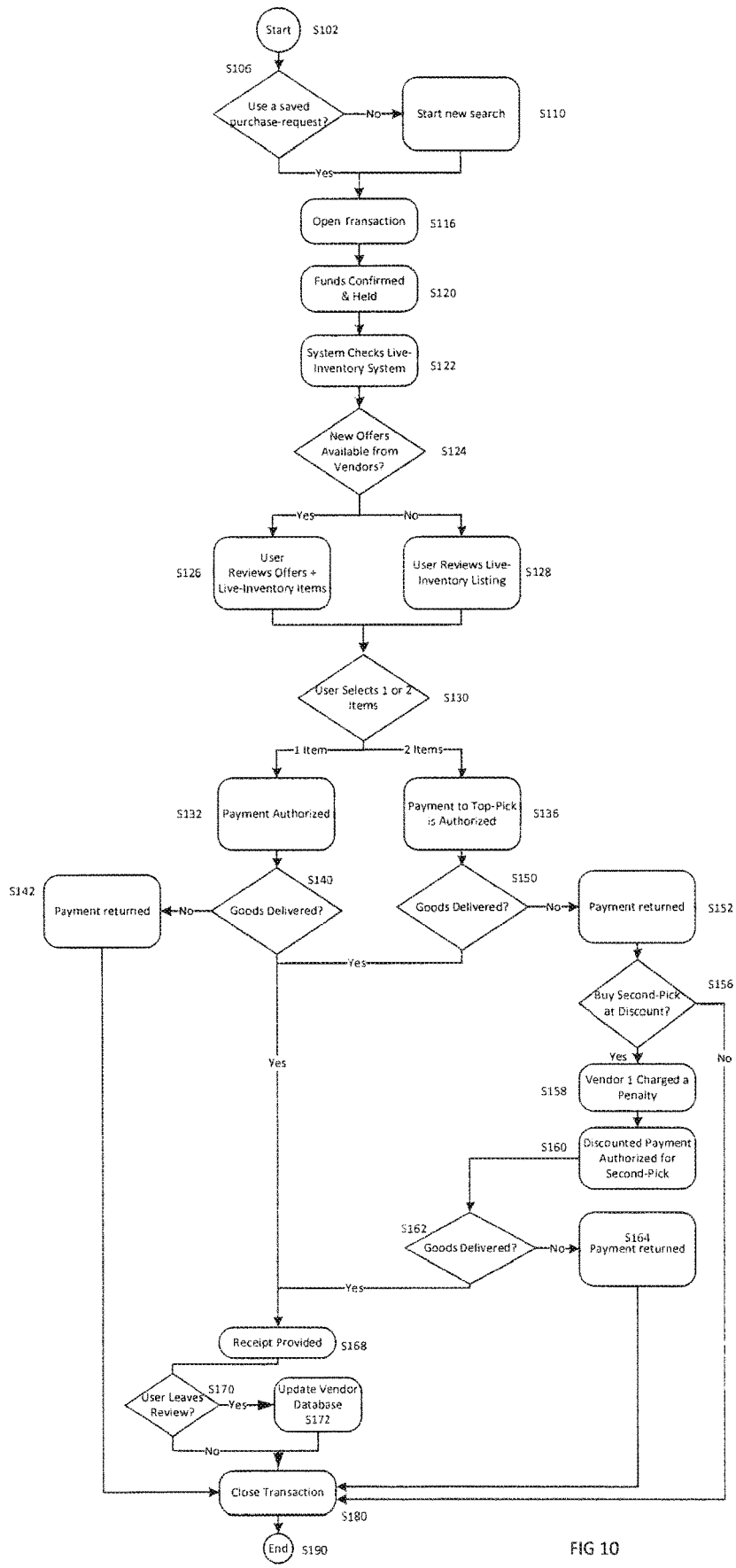
FIG. 10 is a flow chart illustrating a transaction control method in accordance with a further embodiment of the invention.

FIG. 10 illustrates a transaction control method in accordance with an additional embodiment of the invention. The process begins in S102 and the system searches for a user-saved purchase request. If no purchase request is found in S106, the system starts a new search in S110 until the purchase request is found. Once the purchase request is found, the system opens a transaction in S116 and holds and confirms the funds through interaction between the funds processing server and the accounts server in S120. In S122, the system checks the live inventory database for matching items and also checks for offers available from vendors in S124.

If matching items are found in S122 and individualized offers are found from vendors in S124, the system provides them to the subscriber in S126. If only live inventory is found and no offers are located, the system provides the live inventory listings to the subscriber in S128. The system may be configured to locate one or more matches in all circumstances. For example, even if no exact match is found, the system may provide a list including the items meeting a largest number of the subscriber requirements. In embodiments of the invention, the selections are presented to the subscriber in a ranked list format. The ranked list may be based on a degree of matching with the subscriber requirements, on a "deal ranking" calculated by the system, or on reviews of vendors received from subscribers, or on a combination of these factors. Alerts may also be provided in this embodiment as set forth above with respect to FIG. 9 However, in this embodiment, the system allows the subscriber to select multiple items and rank them in a particular order.

Thus, in S130, the subscriber may select one or more of the items presented for purchase. In the illustrated embodiment, in S136, the subscriber can select two items and rank these items in a desired order. The system automatically authorizes payment to the vendor of the top ranked pick of S130 in S136. Alternatively, the subscriber may select one item in S130 and the payment for the single item is authorized in S132.

If the subscriber selects only one item in S140, the system monitors delivery in S140. Monitoring of delivery can include additional steps beyond tracking of shipment. For example, delivery may not be fully satisfied unless the subscriber is satisfied. The delivery may be incomplete or may not be timely. In some instances, the quality of the goods or services may be inadequate, while in other instances, the goods or services may be simply incorrect and may not correspond to the description of the item selected. If delivery is not deemed fully satisfactory in S140, the payment may be returned to the subscriber in S142. However, if the goods are deemed delivered in a satisfactory manor in S140, the system continues to control the transaction to completion.

If the subscriber selects two items in ranked order in S140, the system monitors delivery in S150. Monitoring of delivery is as described above in the instance in which only one item is selected. In both instances, delivery is monitored by the delivery processor. In the one-item scenario, delivery is monitored and if the goods are not delivered in a satisfactory manner, the payment is returned in S142. In the multiple item scenario, if the goods are not delivered in S150, the payment is returned through interaction between the funds processing server and the account server. If the first item is not satisfactorily delivered in S150, the system returns the payment to the subscriber in S152. At this point, the system offers the subscriber the opportunity to purchase the second ranked pick at a discount. If the subscriber chooses not to purchase the second ranked pick, the transaction is closed at S180. However, if the subscriber chooses to purchase the second ranked pick, the vendor failing to perfect delivery for the first ranked item may be charged a penalty commensurate with the provided discount in S158.

In other embodiments of the invention, the discount may be held by the system to offer to the subscriber at a later time in connection with goods or services selected by the subscriber at a later date. Although not specifically shown in FIG. 10, the penalty can also be assessed to the vendor in the one item scenario and in this instance, the subscriber receives the discount in connection with a later transaction.

In S160, the system authorizes the discounted payment to the second vendor for the second ranked pick. In S162, delivery is monitored as described above. If delivery is not satisfied, payment is returned in S164. However, it should be noted, that in other embodiments of the invention, if the user ranks more than two items for selection, the system may continue to offer the user the next ranked pick for purchase and charge a penalty to the vendor responsible for the delivery failure as described above.

If delivery is fully satisfied in either S162 or S140, the system provides a receipt for delivery in S168 and may receive a user review in S170. In S172, the system may update the vendor database with the user review. The user reviews may be utilized in a filtering and sorting algorithm for ranking of results provided to subscribers. In S180, the system closes the transaction and updates inventory as described above. The process ends in S190.

Once the purchased item is delivered, a receipt is provided in S170 and the transaction is closed in S180 as explained above. When delivery is monitored as described above, the automatic updating of inventory in the live inventory database may be delayed until closing of the transaction after delivery has been successfully completed. Thus, all vendors having results displayed will continue to have an inventory hold on the displayed products. In this scenario, the vendors are incentivized to fulfill delivery requirements as a penalty results if they do not. The process ends in S190.

The system as described herein provides an efficient method for controlling a transaction. The system gives purchasers more control over purchasing. The purchasers are not required to stand in line or visit a vendor (in person, online or by phone) only to find that the inventory is unavailable. The system also benefits vendors with additional control over transactions. The vendors are able see what is in the process of being sold. The vendor is provided with notification that multiple pending transactions exist over a particular time period and thus will be prepared for rush as the vendor sees a list of pending transactions prior to subscriber arrival at the business. This is particularly useful, for example, to food service businesses that experience a rush during particular hours. The pending transactions will be displayed for the vendor prior to the rush to allow preparation. The system gives vendors increased knowledge of customer base and how many customers to expect at any given time.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A transaction control system for initiating, processing, and closing a transaction between a subscriber and a vendor, the system comprising:

a computer memory storing data and instructions including at least a downloadable mobile application, wherein the mobile application is downloadable over the Internet for installation on a subscriber mobile device;

a network interface for receiving parameters entered by the subscriber through the mobile application on the subscriber mobile device for storage in the computer memory, wherein the parameters include at least a required subscriber price and a description, and for receiving inventory updates from vendor systems, the inventory updates including at least a vendor price and identifying information;

a live inventory database for storing the vendor updates received from the vendor systems;

a geo-location device configured to determine a location of the subscriber; and at least one computer processor executing the instructions stored in memory and accessing the stored parameters and the live inventory database to, communicate with an accounts server to confirm subscriber funds and place a hold on subscriber funds equal to the required subscriber price;

receive the location of the subscriber;

implement a matching algorithm to detect matching results by determining if any vendor prices and identifying information satisfy any required subscriber prices and descriptions, and by determining whether the location of the subscriber with respect to the vendor is within a proximity requirement;

transmit an alert to the subscriber mobile device when one or more matching results are detected, the alert allowing the subscriber to access the matching results;

receive a selection from the subscriber of at least one of the matching results;

conduct payment processing for the matching results; and close the transaction;

wherein when multiple matching results from multiple vendors are located, the inventory control engine notifies the multiple vendors of the matching results and places a hold on the inventory in the live inventory database for the matching results for each of the multiple vendors.

2. The system of claim 1, wherein an inventory control engine updates the live inventory database when a transaction for a matching result from the vendor is closed.

3. The system of claim 2, wherein upon receipt of a buyer selection for at least one of the matching results from the multiple vendors, the inventory control engine releases the hold on the inventory for unselected matching results and notifies the vendors of the buyer selection.

4. The system of claim 1, wherein the transaction control engine receives vendor offers responsive to the opened transaction and delivers the vendor offers as matching results to the subscriber mobile device.

5. The system of claim 1, wherein the parameters entered by the subscriber include a time requirement and the transaction control system delivers a result as a matching result only when the vendor meets the time requirement.

6. The system of claim 1, wherein the transaction control system allows selection of more than one matching result.

7. The system of claim 1, wherein the transaction control system allows an ordered selection of multiple matching results.

8. The system of claim 1, wherein the system further comprises a delivery monitoring engine for monitoring delivery of an item from the selected vendor corresponding to the selected matching result prior to closing of the transaction.

9. The system of claim 8, wherein a transaction control engine assesses a penalty to the selected vendor upon failure to adequately deliver and provides a discount to the subscriber.

10. The system of claim 1, wherein the alert includes a selectable URL activating the subscriber mobile application and allowing the subscriber to view the selectable results over the Internet from a transaction control website.

11. The system of claim 1, wherein a transaction control engine opens a transaction upon receipt of the parameters from the subscriber.

12. The system of claim 11, further comprising a transaction tracking engine tracking a state of each transaction upon opening of the transaction through closing of the transaction.

13. A transaction control method for initiating, processing, and closing a transaction between a subscriber and a vendor, the method comprising:

storing, in a computer memory, data and instructions including at least a downloadable mobile application, wherein the downloadable mobile application is downloadable over the Internet for installation on a subscriber mobile device;

receiving, through a network interface, parameters entered by the subscriber through the mobile application on the subscriber mobile device for storage in the computer memory, wherein the parameters include at least a required subscriber price and a description;

receiving, through the network interface, inventory updates from vendor systems, the inventory updates including at least a vendor price and identifying information;

storing, in a live inventory database, the received inventory updates from the vendor systems;

determining a location of the subscriber via geo-location;

using at least one computer processor executing the instructions stored in memory and accessing the stored parameters and the live inventory database stored in the computer memory to, communicate with an accounts server to place a hold on subscriber funds equal to the required subscriber price;

implement a matching algorithm utilizing the live inventory database and the stored parameters to detect matching results by determining if any vendor prices and identifying information satisfy any required subscriber prices and description, and by determining whether the location of the subscriber with respect to the vendor is within a proximity requirement;

transmit an alert to the subscriber mobile device when one or more matching results are detected, the alert allowing the subscriber to access the matching results;

receive a selection from the subscriber of at least one of the matching results;

conduct payment processing for the matching result;

close the transaction;

update the live inventory database when a transaction for a matching result from the vendor is closed; and notify the multiple vendors of the matching results and place a hold on the inventory for the matching results for each of the multiple vendors when multiple matching results from multiple vendors are located.

14. The method of claim 13, further comprising releasing the hold on inventory for unselected matching results and notifying the vendors of the buyer selection upon receipt of a buyer selection for at least one of the matching results from the multiple vendors.

15. The method of claim 13, further comprising receiving vendor offers responsive to the opened transaction and delivering the vendor offers as matching results to the subscriber mobile device.

16. The method of claim 13, wherein the parameters entered by the subscriber include a time requirement and the transaction control system delivers a result as a matching result only when the vendor meets the time requirement.

17. The method of claim 13, further comprising allowing selection of more than one matching result in a ranked order.

18. The method of claim 13, further comprising allowing an ordered selection of multiple matching results.

19. The method of claim 17, further comprising monitoring delivery of an item from the selected vendor corresponding to the selected matching result prior to closing of the transaction.

20. The method of claim 19, further comprising assessing a penalty to the selected vendor upon failure to adequately deliver and providing a discount to the subscriber.

21. The method of claim 19, further comprising offering a second ranked selected item to the subscriber upon failure to deliver the selected matching result.

22. The method of claim 13, wherein the alert includes a selectable URL activating the subscriber mobile application and allowing the subscriber to view the selectable results over the Internet from a transaction control website.

23. The method of claim 13, further comprising opening a transaction upon receipt of the parameters from the subscriber.

24. The method of claim 22, further comprising tracking a state of each transaction upon opening of the transaction through closing of the transaction.

\* \* \* \* \*